US010713946B2

(12) United States Patent
Sabagh et al.

(10) Patent No.: US 10,713,946 B2
(45) Date of Patent: Jul. 14, 2020

(54) COMPUTER-IMPLEMENTED SYSTEM AND METHOD FOR VALET PARKING SERVICES

(71) Applicants: Robert P. Sabagh, West Bloomfield, MI (US); James W. Nichols, Detroit, MI (US)

(72) Inventors: Robert P. Sabagh, West Bloomfield, MI (US); James W. Nichols, Detroit, MI (US)

(*) Notice: Subject to any disclaimer, the term of this patent is extended or adjusted under 35 U.S.C. 154(b) by 91 days.

(21) Appl. No.: 16/051,404

(22) Filed: Jul. 31, 2018

(65) Prior Publication Data

US 2019/0035274 A1    Jan. 31, 2019

Related U.S. Application Data

(60) Provisional application No. 62/539,511, filed on Jul. 31, 2017.

(51) Int. Cl.
*G08G 1/14* (2006.01)
*G06Q 20/24* (2012.01)
(Continued)

(52) U.S. Cl.
CPC .......... *G08G 1/144* (2013.01); *G06Q 20/127* (2013.01); *G06Q 20/24* (2013.01); *G07B 15/02* (2013.01);
(Continued)

(58) Field of Classification Search
CPC ........ G08G 1/144; G08G 1/123; G08G 1/146; G06Q 20/127; G06Q 20/24; G06Q 2240/00; G07B 15/02; G07F 17/24
(Continued)

(56) References Cited

U.S. PATENT DOCUMENTS 5,710,557 A    1/1998  Schuette
9,183,734 B2  11/2015  Stefik et al.
(Continued)

*Primary Examiner* — Daryl C Pope
(74) *Attorney, Agent, or Firm* — Mastrogiacomo PLLC

(57) ABSTRACT

A computer-implemented parking system for managing a plurality of vehicle parking spaces disbursed over a plurality of physically separate parking locations, the system comprising at least one central server including one or more databases for storing information associated with a vehicle and user of the vehicle, at least one first computer capable of communicating with the central server, at least one second computer capable of communicating with the central server and the first computer, a payment system that enables an electronic payment to be sent directly from the first computer to the central server, a reservation system, the reservation system enabling a user to reserve one of the plurality of physically separate parking locations on the first computer and the reservation system enabling the user to reserve one of the plurality of physically separate parking locations at a pre-determined time on the first computer, a vehicle retrieval system, the vehicle retrieval system estimating a vehicle retrieval time based upon a number of vehicles to be parked, a number of arrival requests and a number of retrieval requests, the vehicle retrieval system enabling the user to request the vehicle to be retrieved at a pre-determined time on the first computer and the vehicle retrieval system transmitting estimated vehicle retrieval time to the first computer and the second computer, wherein the first computer retrieves user information and vehicle information from the central server and the first computer transmits the user information and vehicle information to the second computer to reserve at least one of the plurality of vehicle parking locations for the vehicle and the second computer alerts the parking system that the vehicle has arrived, wherein the second computer communicates with the central server to send user information, vehicle information and (Continued)

vehicle location information to the central server and wherein the first computer transmits user information, vehicle information and vehicle retrieval information from the central server to the second computer to retrieve the vehicle from the parking location.

15 Claims, 16 Drawing Sheets

(51) Int. Cl.
    *G08G 1/123*     (2006.01)
    *G06Q 20/12*     (2012.01)
    *G07F 17/24*     (2006.01)
    *G07B 15/02*     (2011.01)

(52) U.S. Cl.
    CPC ............ *G07F 17/24* (2013.01); *G08G 1/123* (2013.01); *G08G 1/146* (2013.01); *G06Q 2240/00* (2013.01)

(58) Field of Classification Search
    USPC ............................... 340/539.1, 539.11, 932.2
    See application file for complete search history.

(56) References Cited

U.S. PATENT DOCUMENTS

| | | |
|---|---|---|
| 2005/0177432 A1 | 8/2005 | Nevergole |
| 2012/0047001 A1 | 2/2012 | Chagnon |
| 2012/0078686 A1* | 3/2012 | Bashani ................ G07B 15/02 705/13 |
| 2012/0232965 A1* | 9/2012 | Rodriguez ............ G07B 15/02 705/13 |
| 2013/0113604 A1 | 5/2013 | Marzec et al. |
| 2016/0078689 A1 | 3/2016 | Cheng |
| 2016/0203650 A1 | 7/2016 | Stanford |
| 2017/0103585 A1 | 4/2017 | Hoffman |

\* cited by examiner

COMPUTER-IMPLEMENTED SYSTEM AND METHOD FOR VALET PARKING SERVICES

CROSS REFERENCE TO RELATED APPLICATIONS

This patent application claims the benefit of priority based on U.S. Provisional Patent Application No. 62/539,511 filed on Jul. 31, 2017, which is incorporated by reference in its entirety for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON COMPACT DISC

Not Applicable

BACKGROUND OF THE INVENTION

1. Field of the Invention

The present invention relates generally to a method and system for parking services and, more particularly, to the improvements in valet parking services.

2. Background Art

Valet parking services have been offered to customers almost as long as the automobile has been in use. This particular parking service involves the transfer of a vehicle from an individual or customer to a person, generally referred to as the valet, who is willing to park the vehicle for the customer, generally for a fee, while the customer goes about their business for a period of time. When their business is complete, the customer may return to the valet to retrieve their vehicle rather than going through the hassle of finding the vehicle themselves in a crowded parking lot. Typically, valet parking services can be found at hotels, restaurants, hospitals, stores and any other establishment where the convenience of valet parking may be wanted or needed.

Valet parking services are typically used by the individual to park their vehicle under a number of circumstances. Parking may be limited and/or a distance from the destination and it may be more convenient for an individual to use a valet parking service rather than parking their own vehicle. One may desire to employ the services of a valet for a special event or for prestige. Others, such as the sick or elderly, may desire the assistance of valet parking services at a doctor's office or hospital to avoid lengthy walks. Valet parking may come in handy during inclement weather. Rather than self-parking the vehicle in an open parking lot and walking in the inclement weather to the establishment, one may employ the valet to avoid the poor weather. Lastly, an establishment, such as a fine restaurant, upscale hotel or chic store may require or insist their patrons valet park their vehicles to maintain the reputation of their establishment. Whatever the reason, valet parking services are used by a wide variety of individuals to ease the burden of self-parking their vehicle.

A typical valet may work in the following manner. The customer may travel to an establishment offering valet parking services. The customer may stop at the valet stand, the stand being generally located near the entrance of the establishment. A valet will greet the individual driver of the vehicle as the individual exits the vehicle. The valet may write down information from the individual such as their name and may also write down information from the vehicle such as a license plate number. The valet may give a paper ticket to the individual. This paper ticket typically contains a number or code that will be used at a later time when the vehicle is to be retrieved. A second, matching paper ticket is attached to the individual's key so that the key can be easily found by the valet when the individual desires to retrieve the vehicle. The vehicle is parked by the valet and the keys are typically stored, with the matching paper ticket, until the vehicle is to be retrieved.

BACKGROUND OF THE INVENTION

When the individual has completed their business, the individual returns to the valet stand to retrieve their vehicle. The individual provides the paper ticket to the valet and the valet finds the matching paper ticket attached to the key to the vehicle in the key storage area. Having recovered the key, the valet sets off to find and retrieve the vehicle for the individual. The valet returns to the valet stand with the vehicle and the individual is able to get back into the vehicle and drive off. The individual generally pays for this service at the time the vehicle is retrieved or at some other point while the vehicle is in the care of the valet. Many times, an individual may also tip a valet for retrieving their vehicle. Typically, the payments to the valet for the convenience of having the valet park the vehicle and the tip are made by cash. There are some instances when the payment of the valet service may be added to other charges, for example, hotels often add the cost of the valet service to the hotel bill for anyone purchasing a room at the hotel. Although hotels may offer this type of payment opportunity, there are many other establishments, such as stores and restaurants that offer valet services but do not have the opportunity to add the charges for valet services to an existing open bill such as a hotel bill. Generally, all tips are paid by cash.

Often, the above may be a seamless and painless convenient transfer of the vehicle from the individual to the valet to the parking lot and back to the individual once again when their business is complete. However, there are several issues with the present system. An individual may arrive at a destination only to find out that there are no valet parking spaces available at a particular establishment. By the time the individual arrives at a destination only to find there are no parking spaces, it is to late to change plans or to make other arrangements.

Further, an individual may be provided with a paper ticket upon arrival at a destination, but may lose the paper ticket at some point during the valet parking time period. Upon returning to the valet stand to retrieve their vehicle, the individual does not have the paper ticket or any other readily available proof to provide to the valet that the vehicle being retrieved actually belongs to the individual. If another individual finds the ticket, that individual may present the paper ticket to the valet to retrieve the original owner's vehicle, thereby stealing the original owner's vehicle.

If the individual convinces the valet that the vehicle in question actually belongs to the individual, the valet must take the time to go through all the keys at the valet stand to find the correct set of keys. This puts the valet behind with helping other customers and may cost the individual added funds to retrieve their vehicle. Also, the valet may lose the paper ticket, add the paper ticket to the wrong set of keys or incorrectly write down information on the ticket that will result in delays to retrieve the vehicle for the individual.

A further disadvantage of the present valet parking system is that the customer may have to wait in line to retrieve their vehicle. If a number of people are leaving an establishment at the same time, for example, a performance at a theater has ended and a number of people are leaving at the same time, there will be a number of people at the valet stand waiting to retrieve their vehicles. It may take the valet several minutes to possibly an hour or more to find, retrieve the vehicle and return the vehicle to the rightful owner. If you add the possibility of lost tickets, misplaced keys and the like to the chaos of a number of people all wanting their vehicle at the same time, the time to retrieve the vehicles make extend even longer.

Traditionally, the payment for valet services has been made with cash. However, many individuals are no longer carrying cash and are relying on the use of credit and debit cards to may everyday purchases. More and more people are also adding the ability to access and make payments to their credit and debit cards through their smartphone. While companies offering valet services have the ability to receive credit card and debit card payments, it is often cumbersome to do so. The valet must swipe a card or scan a phone for each person that is using the valet services, taking more time than receiving cash. This puts the valet behind when parking or retrieving vehicles especially if there are a number of individuals waiting for their vehicle. Further, valets doing the work of parking and retrieving vehicles are missing out on added income because tips, incentives to valets that work hard and had been paid for in cash and directly to the valet retrieving the vehicle, may be paid by credit card or debit card. Paying tips by credit card or debit card requires that all collected tips may have to be to shared amongst all valets, some not working as hard as others. Lastly, paying for valet services by credit or debit card may result in no tip at all.

Therefore, a need exists for a system and method for valet parking services that will allow an individual to reserve a valet parking spot ahead of arriving at their destination. A need exists for the system and method for valet parking services to ensure that a proper record of the individual, the individual's vehicle and payment method are kept in a secure database for ease of retrieval when reserving a valet parking space. The system and method will also ensure that there is no requirement for a paper ticket and, therefore, no means to lose, misplace, or capture incorrect information on the paper ticket. Further, a need exists for the system and method that will enable an individual to request their vehicle at a specified time for retrieval and know, prior to arriving at the valet stand, how much time it will take to retrieve the vehicle and whether the vehicle has arrived at the stand. Still further, a need exists for a system and method for valet parking services that will ensure a seamless payment or transaction without the use of cash that will enable payment for valet services and any tips through alternative means without disrupting the flow of parking and retrieving vehicles in a timely manner.

BRIEF SUMMARY OF THE INVENTION

A computer-implemented parking system for managing a plurality of vehicle parking spaces disbursed over a plurality of physically separate parking locations, the system comprising at least one central server including one or more databases for storing information associated with a vehicle and user of the vehicle, at least one first computer capable of communicating with the central server, at least one second computer capable of communicating with the central server and the first computer, a payment system that enables an electronic payment to be sent directly from the first computer to the central server, a reservation system, the reservation system enabling a user to reserve one of the plurality of physically separate parking locations on the first computer and the reservation system enabling the user to reserve one of the plurality of physically separate parking locations at a pre-determined time on the first computer, a vehicle retrieval system, the vehicle retrieval system estimating a vehicle retrieval time based upon a number of vehicles to be parked, a number of arrival requests and a number of retrieval requests, the vehicle retrieval system enabling the user to request the vehicle to be retrieved at a pre-determined time on the first computer and the vehicle retrieval system transmitting estimated vehicle retrieval time to the first computer and the second computer, wherein the first computer retrieves user information and vehicle information from the central server and the first computer transmits the user information and vehicle information to the second computer to reserve at least one of the plurality of vehicle parking locations for the vehicle and the second computer alerts the parking system that the vehicle has arrived, wherein the second computer communicates with the central server to send user information, vehicle information and vehicle location information to the central server and wherein the first computer transmits user information, vehicle information and vehicle retrieval information from the central server to the second computer to retrieve the vehicle from the parking location.

BRIEF DESCRIPTION OF THE SEVERAL VIEWS OF THE DRAWINGS

The features and inventive aspects of the present invention will become more apparent from the following detailed description, claims, and drawings, of which the following is a brief description:

DETAILED DESCRIPTION OF THE INVENTION

Figure 1:
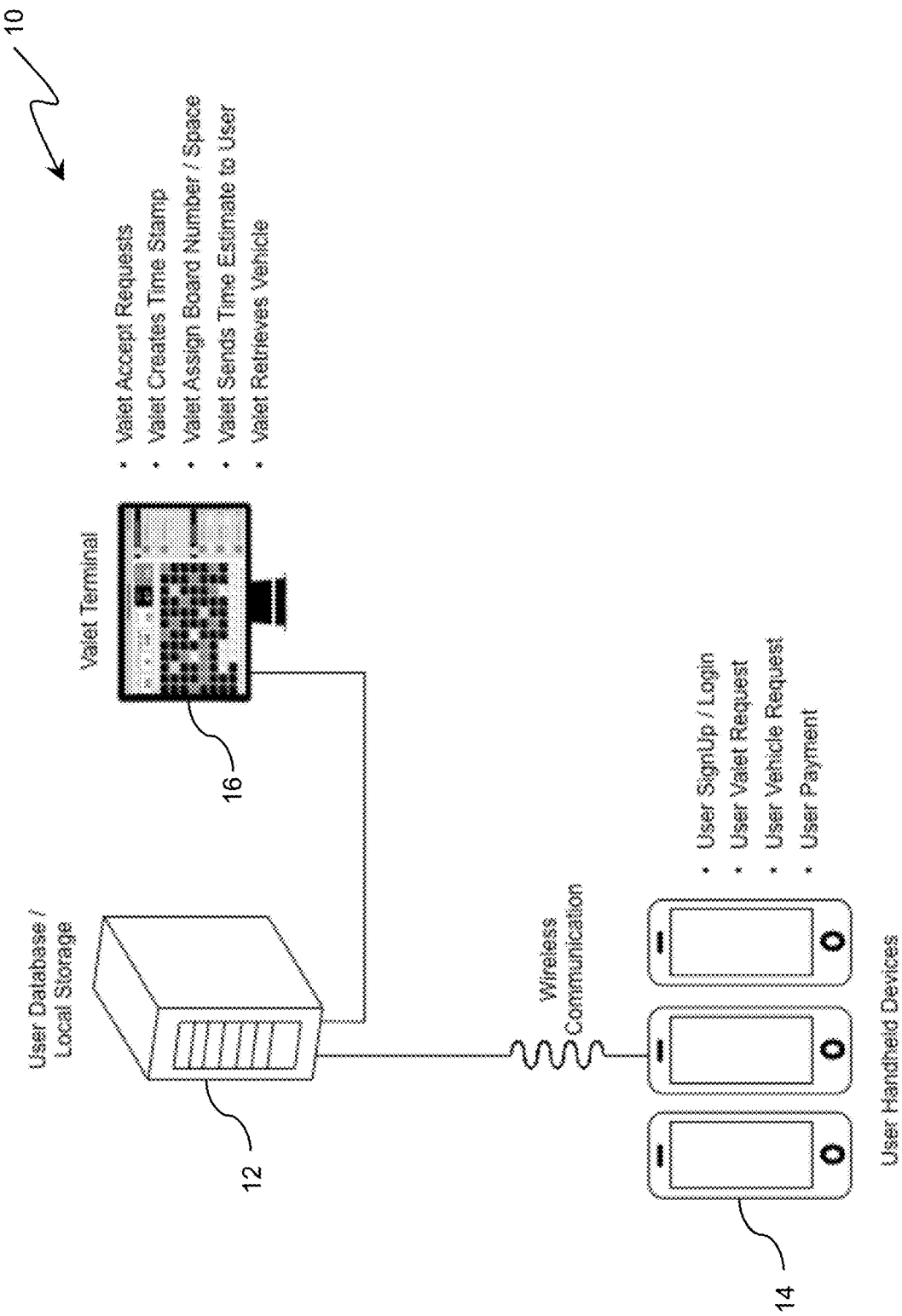
FIG. 1 is a diagram illustrating a computer-based valet parking system according to an embodiment of the present invention.

Referring now to the drawings, preferred illustrative embodiments of the present invention are shown in detail. Although the drawings represent embodiments of the present invention, the drawings are not necessarily to scale and certain features may be exaggerated to better illustrate and explain the present invention. Further, the embodiments set forth herein are not intended to be exhaustive or otherwise to limit or restrict the invention to the precise forms and configurations shown in the drawings and disclosed in the following detailed description.

Valet parking services are offered across the globe to anyone that has a need to park a vehicle for a length of time. Valet parking services offer the following advantages: convenience, an escape from inclement weather, safety, prestige and like advantages versus self parking. A computer-implemented valet parking system 10 is illustrated in FIG. 1. Valet Parking System 10 includes at least one central server 12 and at least one first computer 14 capable of communicating and exchanging information with central server 12. System 10 also includes at least one second computer 16 capable of communicating and exchanging information with server 12 and first computer 14.

Central Server 12 is a computer as well that stores data that may be used in valet parking system 10. Server 12 may include data that has been used to create and maintain an account by a user of valet parking system 10. Such data may include user or individual identification information such as name, driver's license number and a photo to be used for identification purposes, an email address and telephone number for contacting purposes, a user identification, a password, payment information and the like. Vehicle information may also be stored on server 12 such as name or nickname of vehicle, license plate number, license plate state, vehicle make, vehicle model, vehicle color and an image of the vehicle. Other information may be stored on server 12 such as valet information, parking locations, the number of available parking locations, timekeeping information and the like. Sever 12 may be one of many separate and distinct computers to interface with first computer 14 and second computer 16.

First computer 14 may be a hand held device such as a smart phone or tablet or a computer terminal such as a desktop style computer and monitor that communicates with server 12. Alternatively, first computer 14 may be included in a vehicle as an embedded modem that allows the vehicle to connect and communicate with server 12. An individual may use first computer 14 to access the above-described information stored on server 12 when the individual desires to employ the services of valet parking system 10. First computer 14 may be one of many separate and distinct computers to interface with server 12 and second computer 16.

Second computer 16 may be a hand held device such as a smart phone or tablet or a computer terminal such as a desktop style computer and monitor. Second computer 16 also communicates with server 12. Second computer 16 accepts requests and reservations for valet parking from first computer 14 through server 12 as well as requests to retrieve parked vehicles from first computer 14 through server 12. Second computer 16 may be one of many separate and distinct computers to interface with server 12 and first computer 14.

Connectivity of servers 12, first computers 14 and second computers 16 may be accomplished with networks such as an internet and/or wireless network such as a cellular telephone network, a wired or wireless local area network (LAN) or wide area network (WAN) and the like. Vehicle parking system 10 may be implemented on applications that run on a single or a variety of operating system platforms including, but not limited to Apple OS, WINDOWS, UNIX, IOS, ANDROID, SYMBIAN, LINUX or embedded operating systems such as VsWorks. Vehicle parking system 10 may operate with various web browsers, including but not limited to Internet Explorer, Safari, Mozilla Firefox and others that access and communicate with various types of web pages constructed with various mark-up languages such as HTML and the like.

Referring now to FIGS. 2-7, the operation of valet parking system 10 will now be described in greater detail. An individual desiring to use the services provided by valet parking system 10 will first download the valet parking system 10 application to first computer 14. Once the application is downloaded, the individual or user of parking system 10 will be presented with a screen on first computer 14 that resembles a login or create account screen, generally referred to as a login screen 600 in FIG. 12A. The user will be asked to either "Login" to the application or "Create An Account" at step 100 in FIG. 2. If the user has an existing account on file on server 12, the user will be directed to continue the login in process at step 110. If this is the first time the user has accessed valet parking system 10 application, the user will be instructed to create an account at step 120.

Figure 12B:
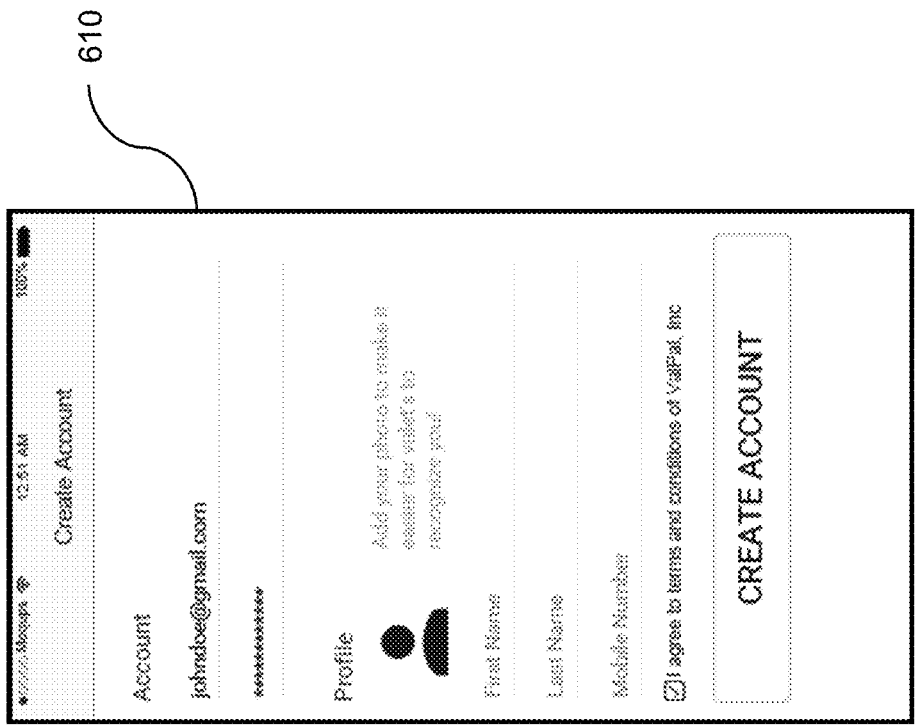
FIGS. 12A-12J are various screen shots of a second user interface computer screen for the computer-based valet system according to an embodiment of the present invention.
Figure 12A:
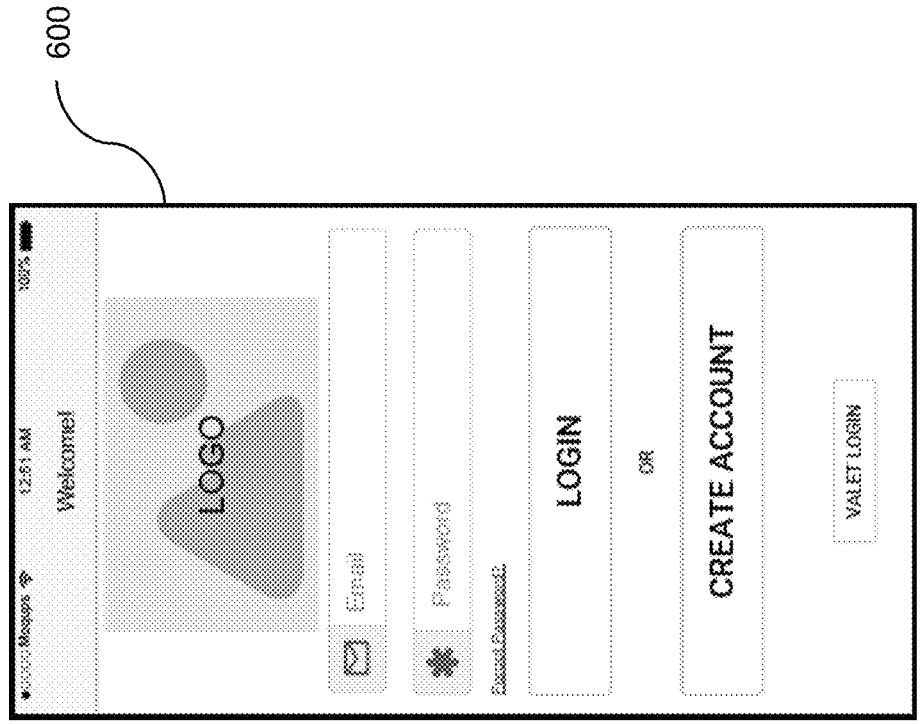

Creating the new account takes the user through a number of steps to ensure that valet parking system 10 has enough information to identify the individual or user, identify the vehicle or vehicles driven by the individual and a form of payment. The individual begins by entering an email address at step 130, followed by a password to the access the account at step 140. A programming routine within system 10 ensures that a valid password has been entered at step 150. If an invalid password has been entered, the individual must re-enter a new password at step 140. Once a valid password has been established, the individual continues with entering their name at step 160, uploading a valid photograph for identification purposes at step 170 and a phone number. The information may be entered into a user profile screen 610 as illustrated in FIG. 12B. A payment system requires information on a form of payment, generally a credit card, debit card or other financial institution account information, may be entered at step 180. A valid name, step 190, credit card number, debit card number or other financial institution account number at step 200, CVV2 code at step 210 and zip code at step 220 may be entered into system 10. The programming routine within system 10 ensures that a valid credit card or debit card has been entered at step 220. If invalid credit card, debit card or financial institution account information has been entered, the individual must re-enter the credit card, debit card or financial institution account information starting at step 180.

Figure 12D:
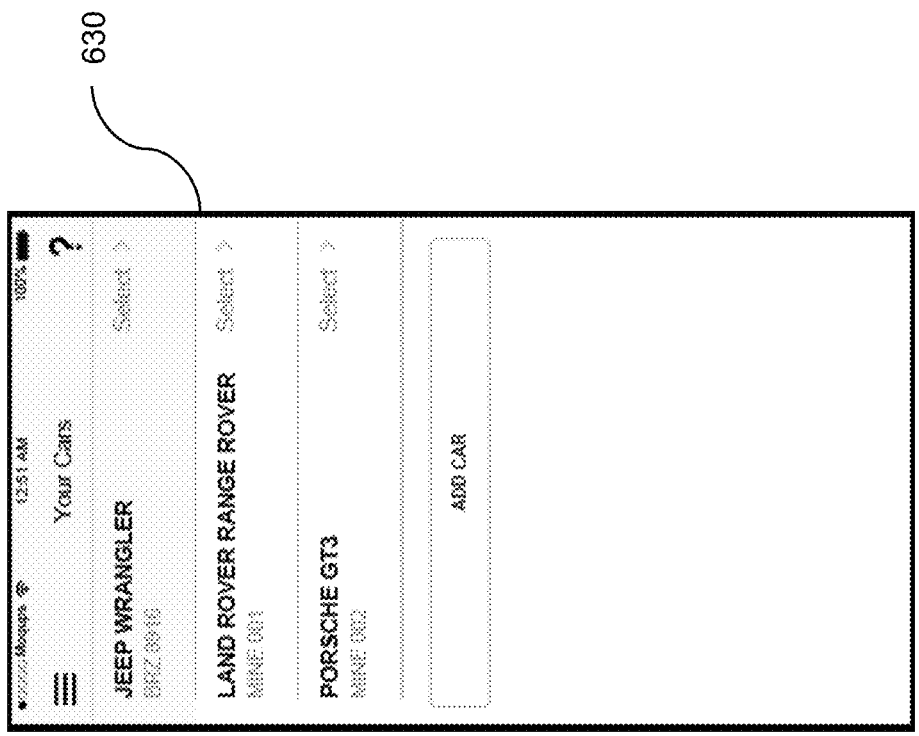
Figure 12C:
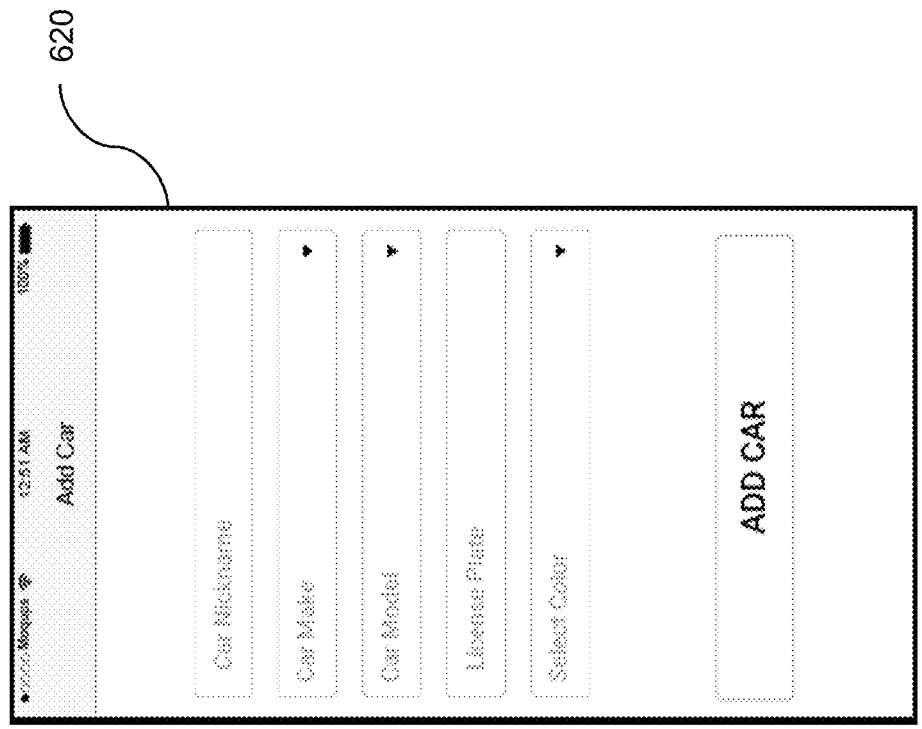

After entering their personal information, the individual will be asked to input information about one or more vehicles they plan to use in valet parking system 10. At step 230 in FIG. 3, the individual may enter the information for the vehicle. The individual may enter a nickname for the vehicle at step 240 and the license plate letters and/or numbers and state at step 250. At step 260, the individual may select from a list of vehicle makes 290 from a database kept on server 12. Once the vehicle make is selected, the vehicle model can be chosen at step 270 from a list of vehicle models 300 kept in the database and the vehicle color may be selected at step 280 from a list of vehicle colors 310 kept in the same database on server 12. The information may be entered into a vehicle profile screen 620 as illustrated in FIG. 12C. Information on one or more vehicles that is stored on server 12 may be displayed on a vehicle screen 630 as illustrated in FIG. 12D. Having the vehicle information stored on server 12 for a particular individual may enable the valet to find and retrieve the vehicle more accurately and much faster than simply searching for a parking lot spot number or by using the key fob to activate the vehicle alarm to identify the vehicle. This will help to improve throughput of the valet services and increase revenue. More importantly, it will help to improve the reputation of the establishment and the company providing the valet parking services, thus helping to ensure that even more individuals will utilize the valet parking services and visit the establishment.

Figure 2:
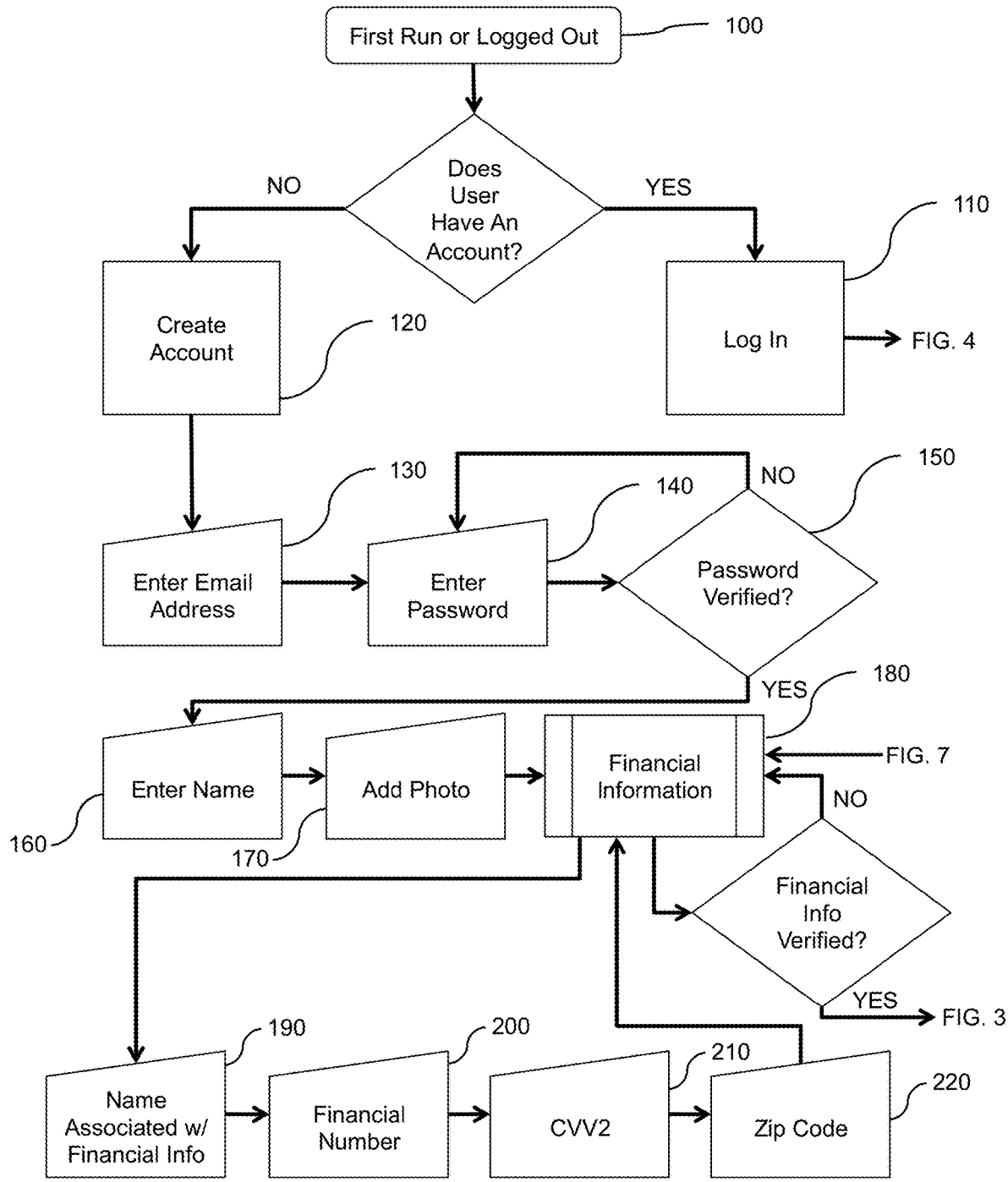
FIG. 2 is a first flow chart for the computer-based valet parking system according to an embodiment of the present invention.
Figure 3:
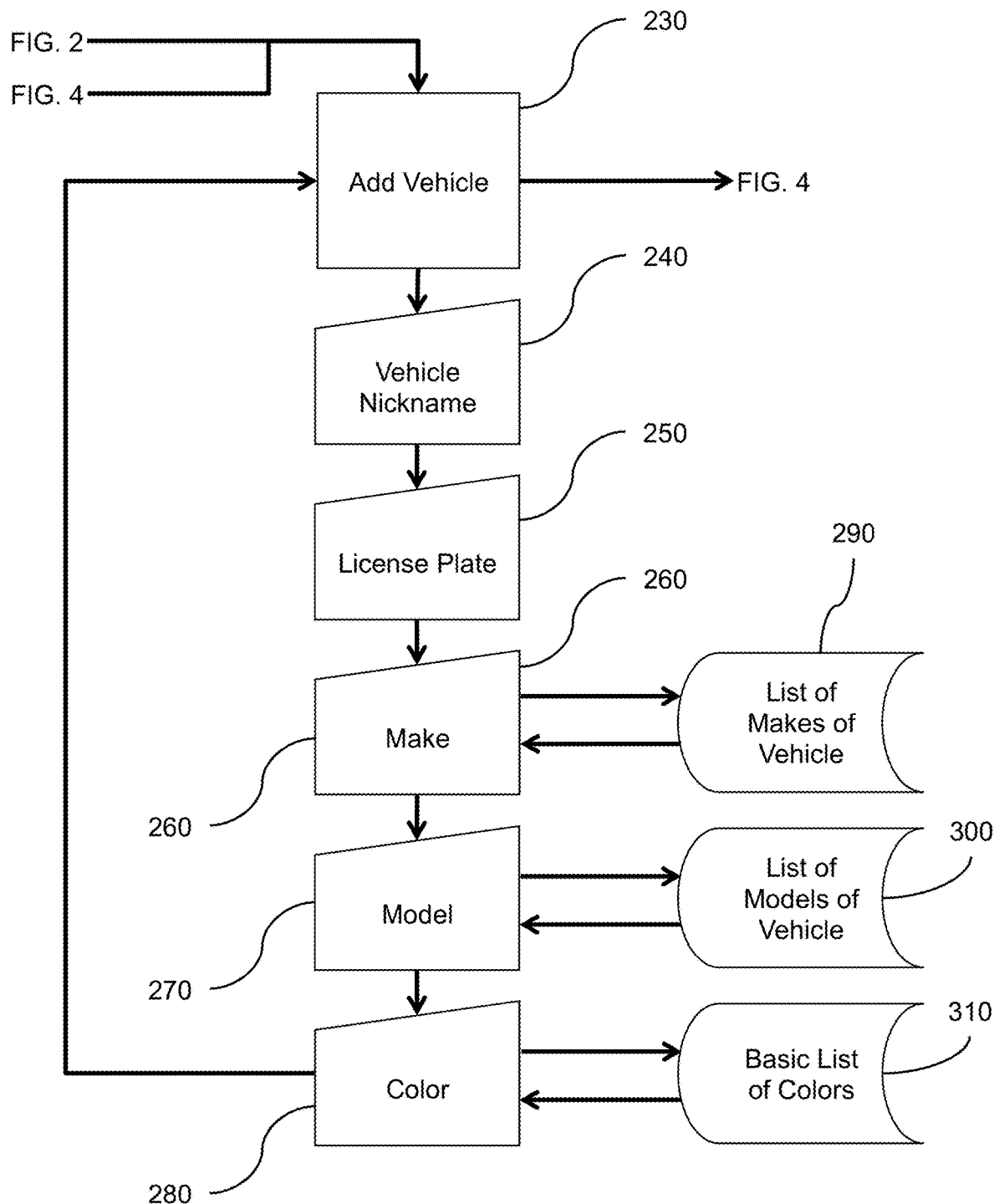
FIG. 3 is a second flow chart for the computer-based valet parking system according to an embodiment of the present invention.
Figure 4:
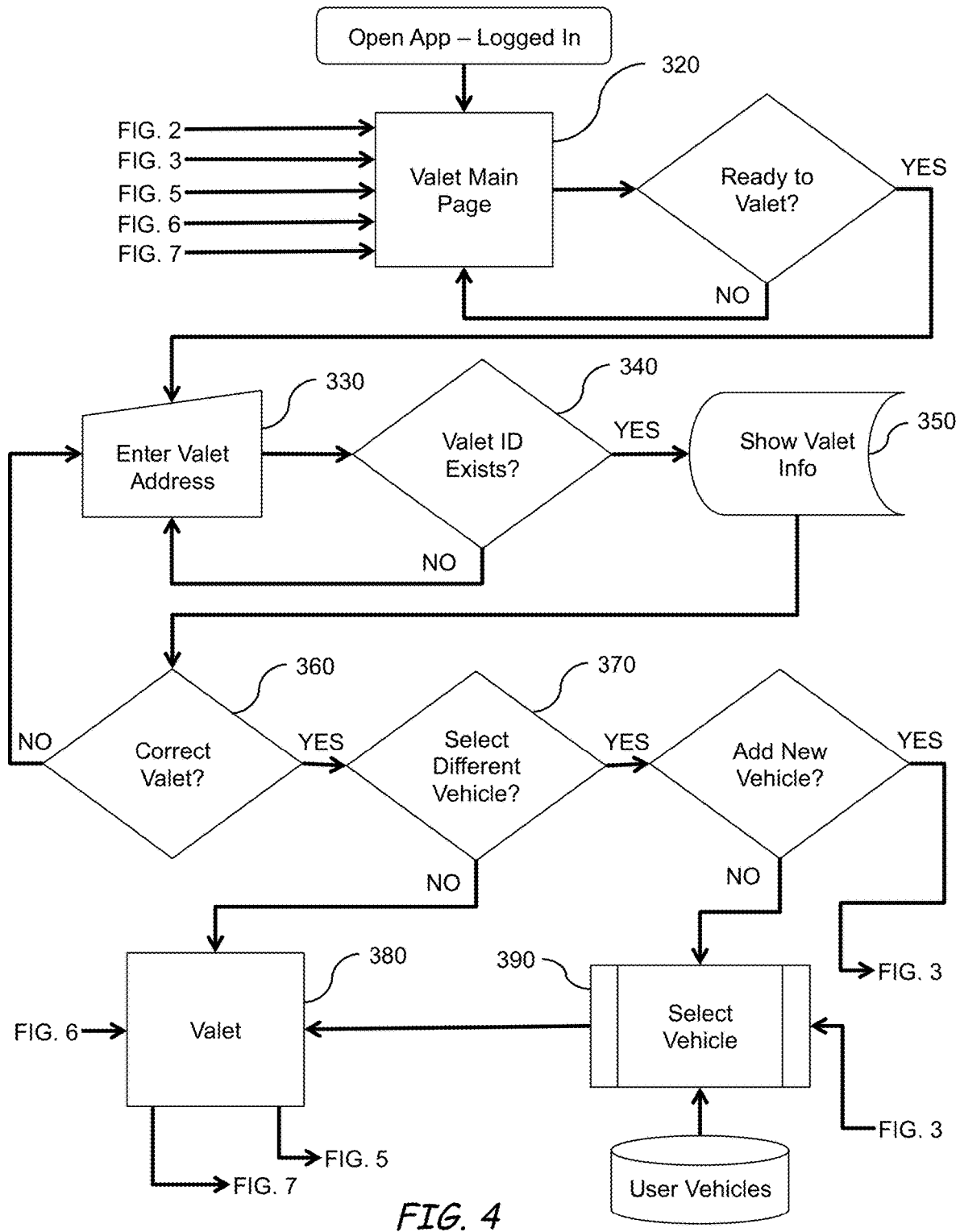
FIG. 4 is a third flow chart for the computer-based valet parking system according to an embodiment of the present invention.
Figure 5:
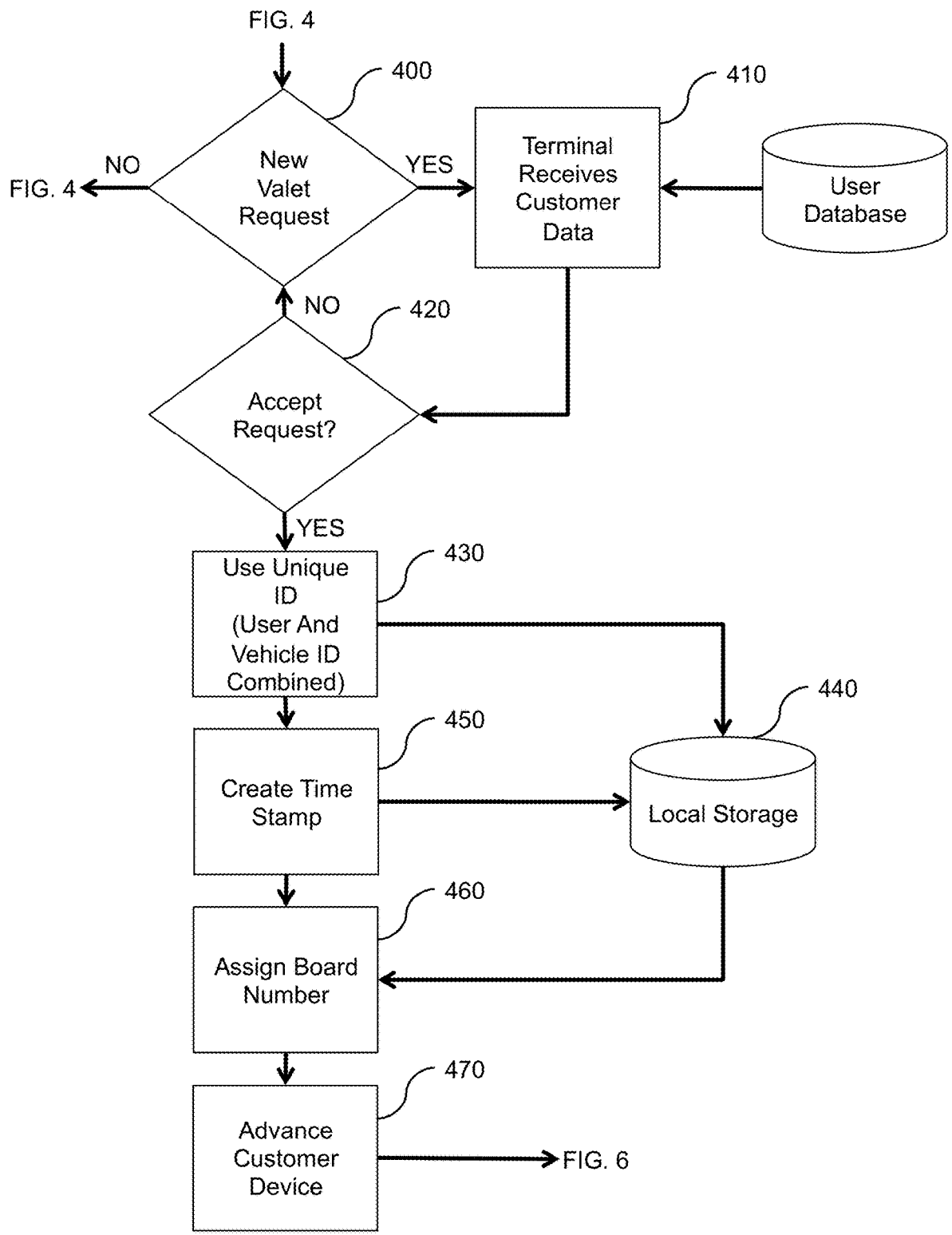
FIG. 5 is a fourth flow chart for the computer-based valet parking system according to an embodiment of the present invention.
Figures 12E, 12F:
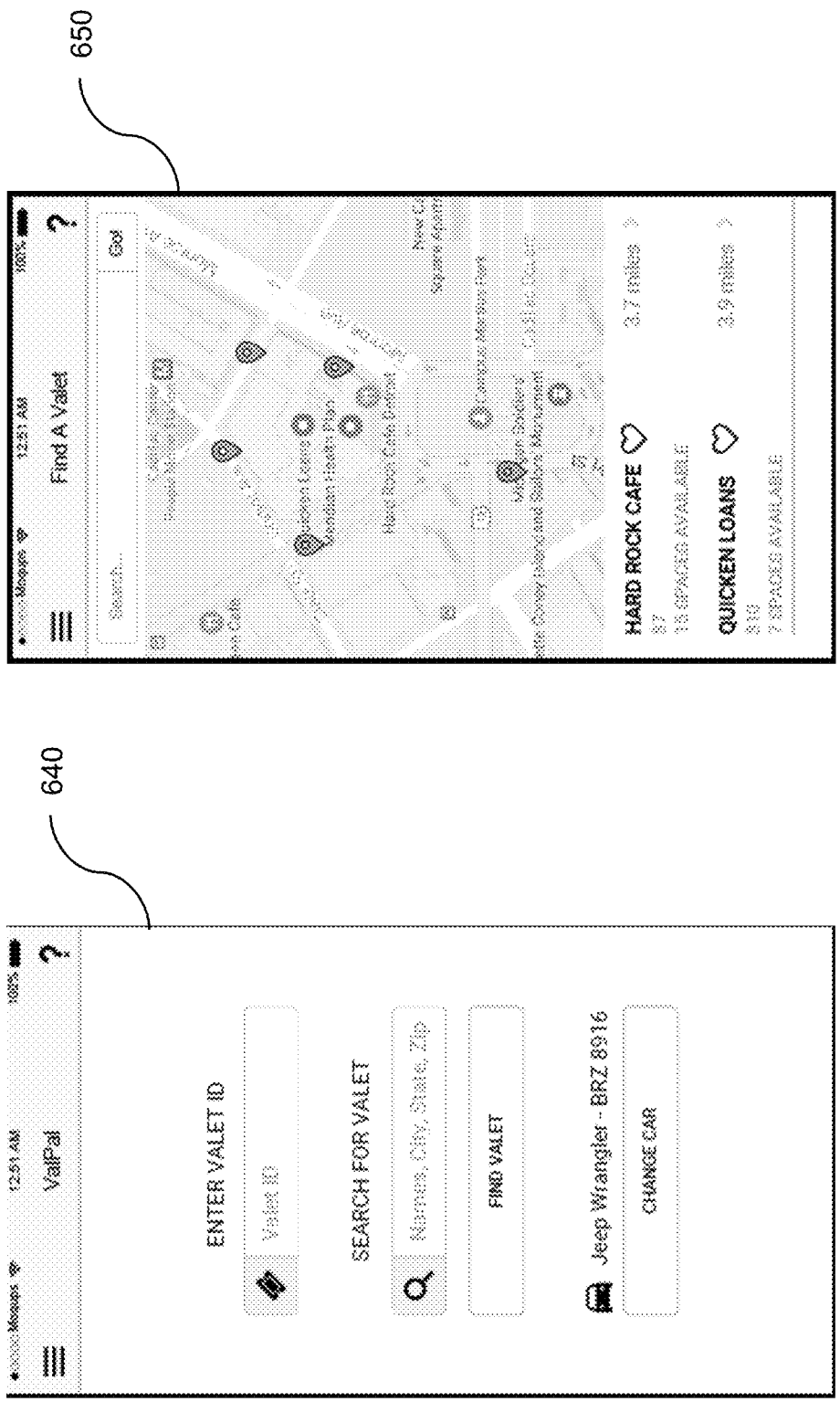

After an account has been established and the individual has identified at least one vehicle in their account, the individual may log into their account at step 110 in FIG. 2. The individual will be directed to a valet main page at step 320 in FIG. 4. When ready to valet the vehicle, the individual will search for a valet address at step 330 to ensure that the establishment has a valid valet parking system 10 in operation at step 340. Information for each valet operating a valid valet parking system 10 will be stored in the database of server 12 and may be accessed by first computer 14 at step 350 through a valet search screen 640 illustrated in FIG. 12E and map screen 650 depicted in FIG. 12F identifying the location of a valid valet operating with valet parking system 10. Once identified, valet screen 660 illustrated at FIG. 12G will invite the individual to begin the valet parking process of valet parking system 10.

Upon identifying a valid valet at step 340 and ensuring the individual has the correct valet for the establishment they will be patronizing at step 360, the individual will be asked to identify a time the individual will be arriving at the establishment and to identify the vehicle that will be valet parked at the establishment at step 370. If the desired vehicle is already selected, the individual will be directed to the valet process at step 380. If another vehicle is to be valet parked, the individual may either select a different vehicle from the list of vehicles in their personal database at step 390 or be directed to enter the information for a new vehicle to be added to the database at step 230 of FIG. 2.

When a new valet request is sent to valet parking system 10 at step 400 (see FIG. 5), server 12 receives the request to valet at step 410 and determines whether to accept the request to valet or not accept the request to valet at step 420. Server 12 may decline the request to valet the vehicle for a variety of reasons such as the lack of available parking spaces or inability to make payment. If server 12 denies the request to valet, the individual is alerted and the individual has the option to try again later or select an alternative establishment. This will save the individual time and money by ensuring that the individual has information about the level of activity at the establishment prior to arrival. This will provide the individual an opportunity to change their plans ahead of time to mitigate any potential loss of activity.

Figure 11:
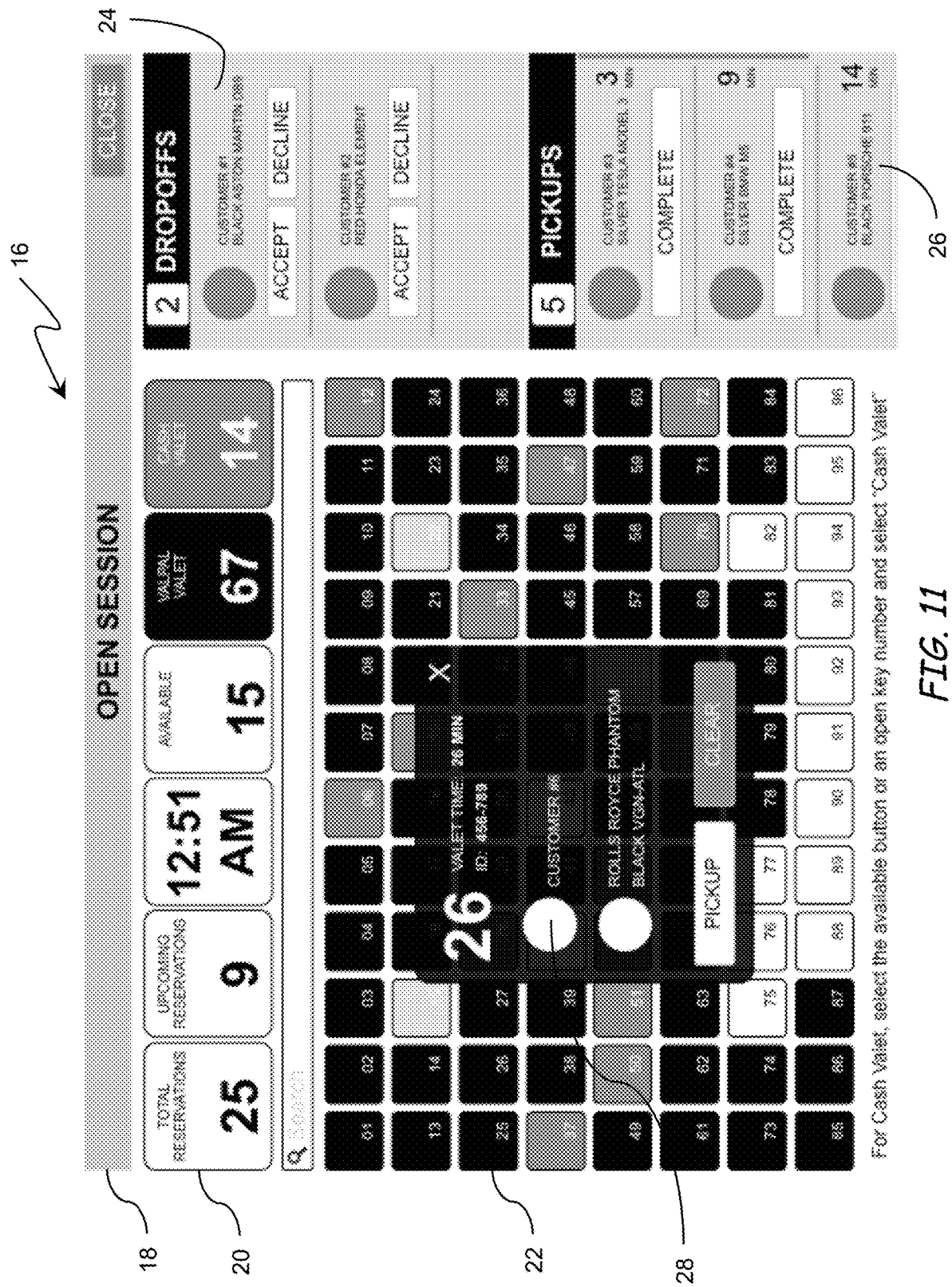
FIG. 11 is a fourth screen shot of the first user interface computer screen for the computer-based valet park system according an embodiment of the present invention.
Figure 12H:
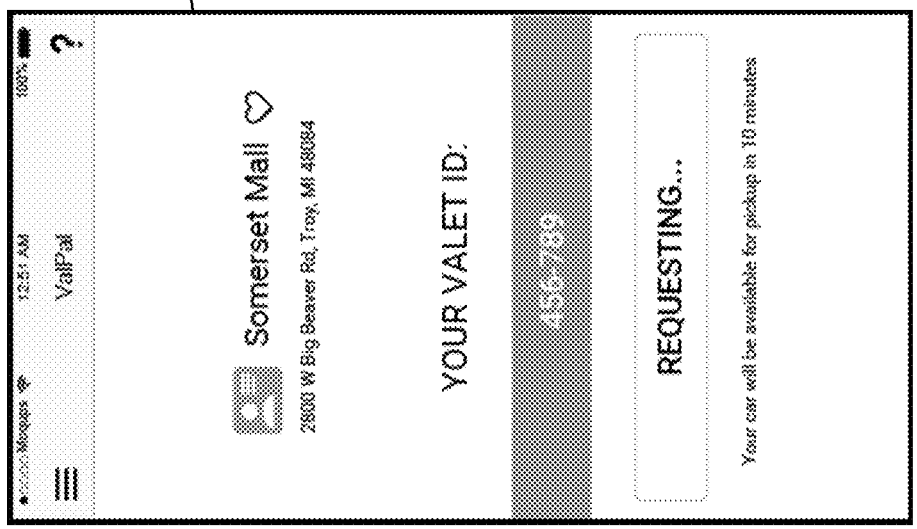
Figure 12G:
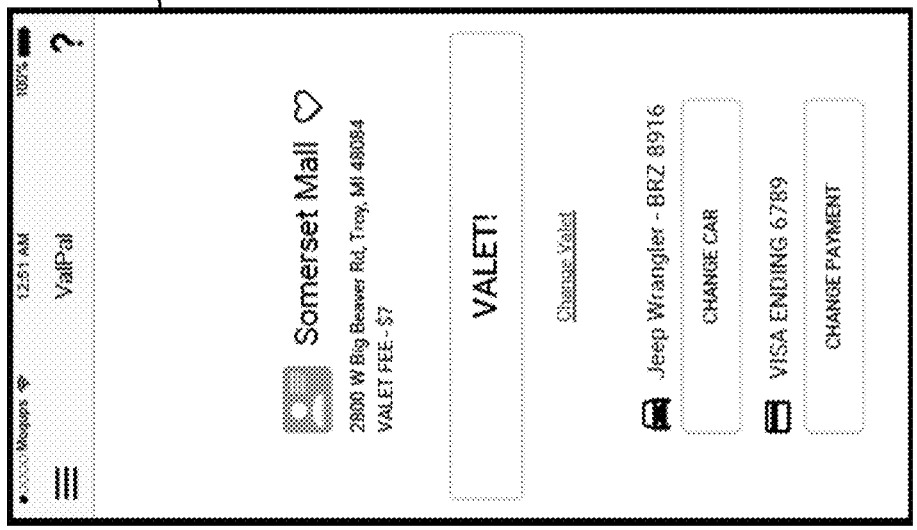

If the request to valet is accepted by the establishment at step 420, a unique identification number is issued by server 12 at step 430 and is sent to the database at step 440 and to first computer 14 on a valet ID screen 670 depicted in FIG. 12H to inform the individual that their reservation has been accepted. The same identification number is also sent to second computer 16 to alert the valet at the establishment that a parking spot has been reserved through valet parking system 10. A time stamp of when the vehicle will arrive is loaded into database of server 12 at step 450. The time stamp may be based upon a time entered by the individual when they desire to arrive at the destination. The individual may also adjust the time of arrival at the destination by modifying the arrival time through first computer 14 if the individual anticipates an earlier arrive or possible delays. Alternatively, sever 12, through first computer 14, may alert the individual that they are late for their reserved time and may ask the individual to identify a new arrival time or request the individual to cancel the reservation. Upon receipt of the vehicle identification number and time stamp, server 12 identifies an open parking position and assigns a board number for the vehicle at step 460 and illustrated on a terminal 18 of second computer 16 in FIGS. 8-11 to alert the valet at the establishment that a reservation to valet park a vehicle has been made and the vehicle will arrive at the specified time. Server 12 sends the same reservation and time information to the individual at step 470 through first computer 14. This will help to facilitate a seamless and timely transfer of the vehicle from the individual to the valet when the individual arrives at the establishment, thus lessening the burden on the individual to have to worry about parking the vehicle when they arrive at the destination.

The individual arrives at the establishment in the specified vehicle. The valet at the establishment identifies the vehicle and approaches the vehicle as the individual arrives. The individual gives control of the vehicle to the valet and the valet parks the vehicle in the spot specified by server 12 on terminal 18 of second computer 16. The vehicle remains in the specified parking space until the individual is ready to retrieve the vehicle for any reason.

Figure 6:
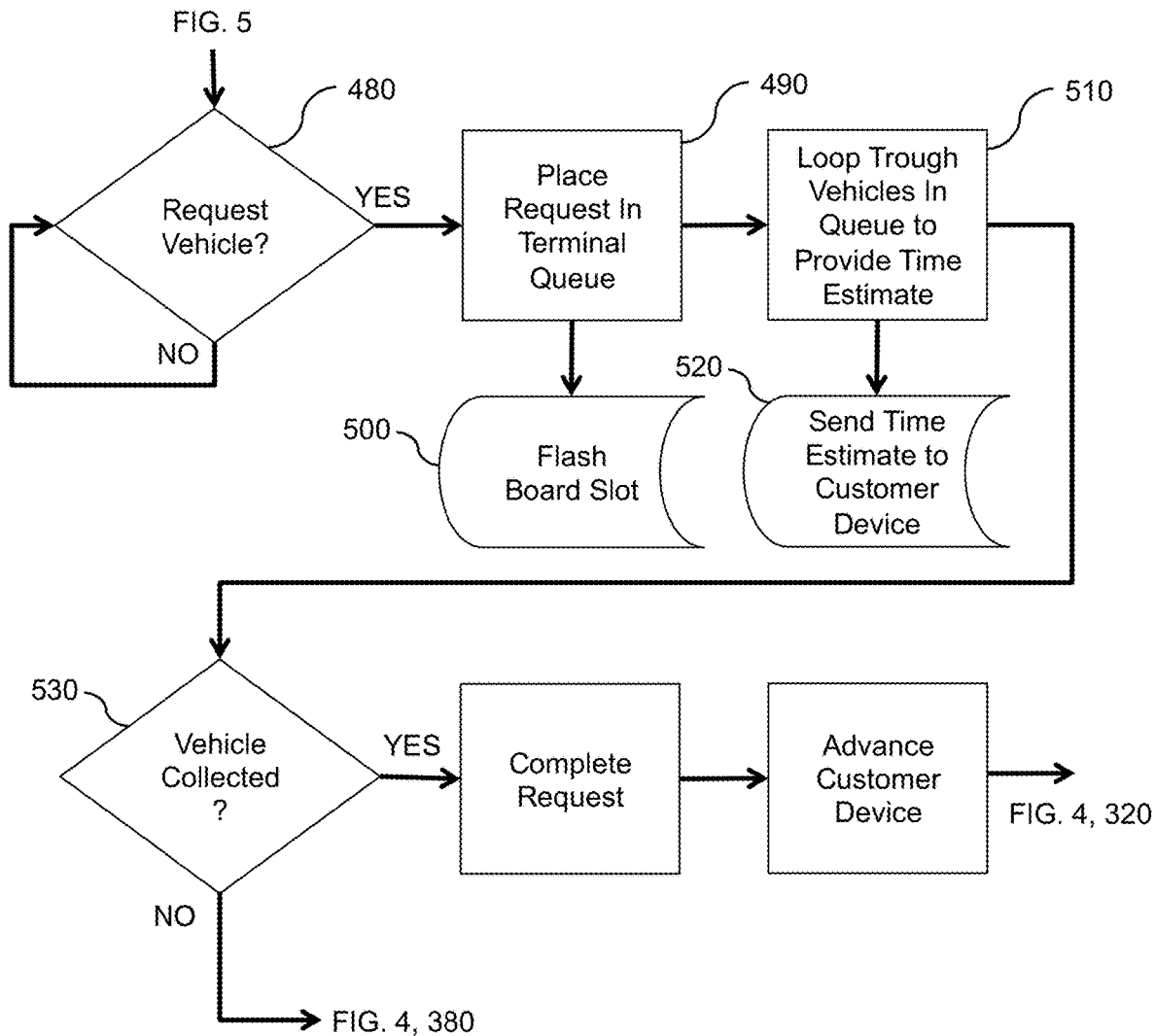
FIG. 6 is a fifth flow chart for the computer-based valet parking system according to an embodiment of the present invention.
Figure 7:
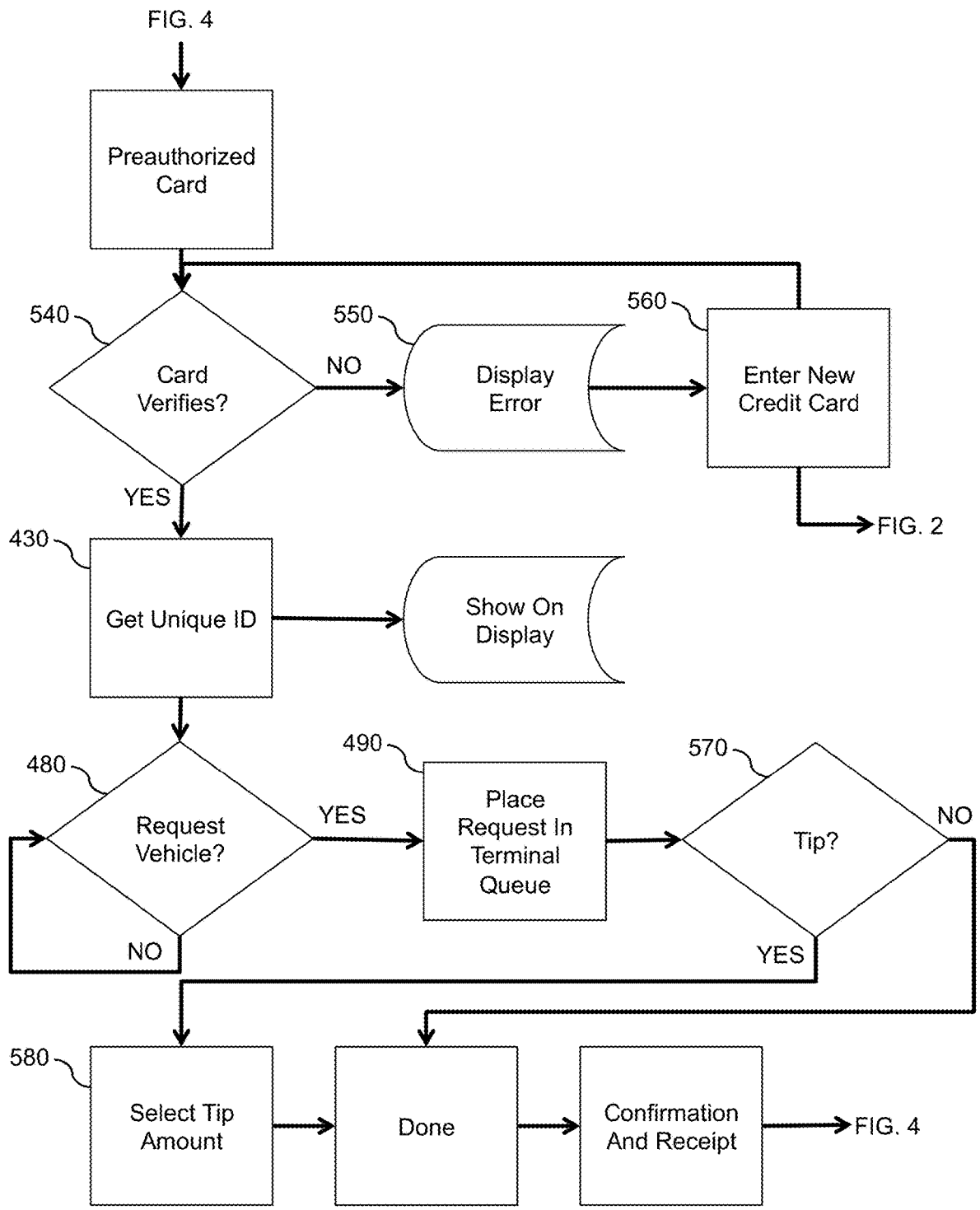
FIG. 7 is a sixth flow chart for the computer-based valet parking system according to an embodiment of the present invention.
Figure 8:
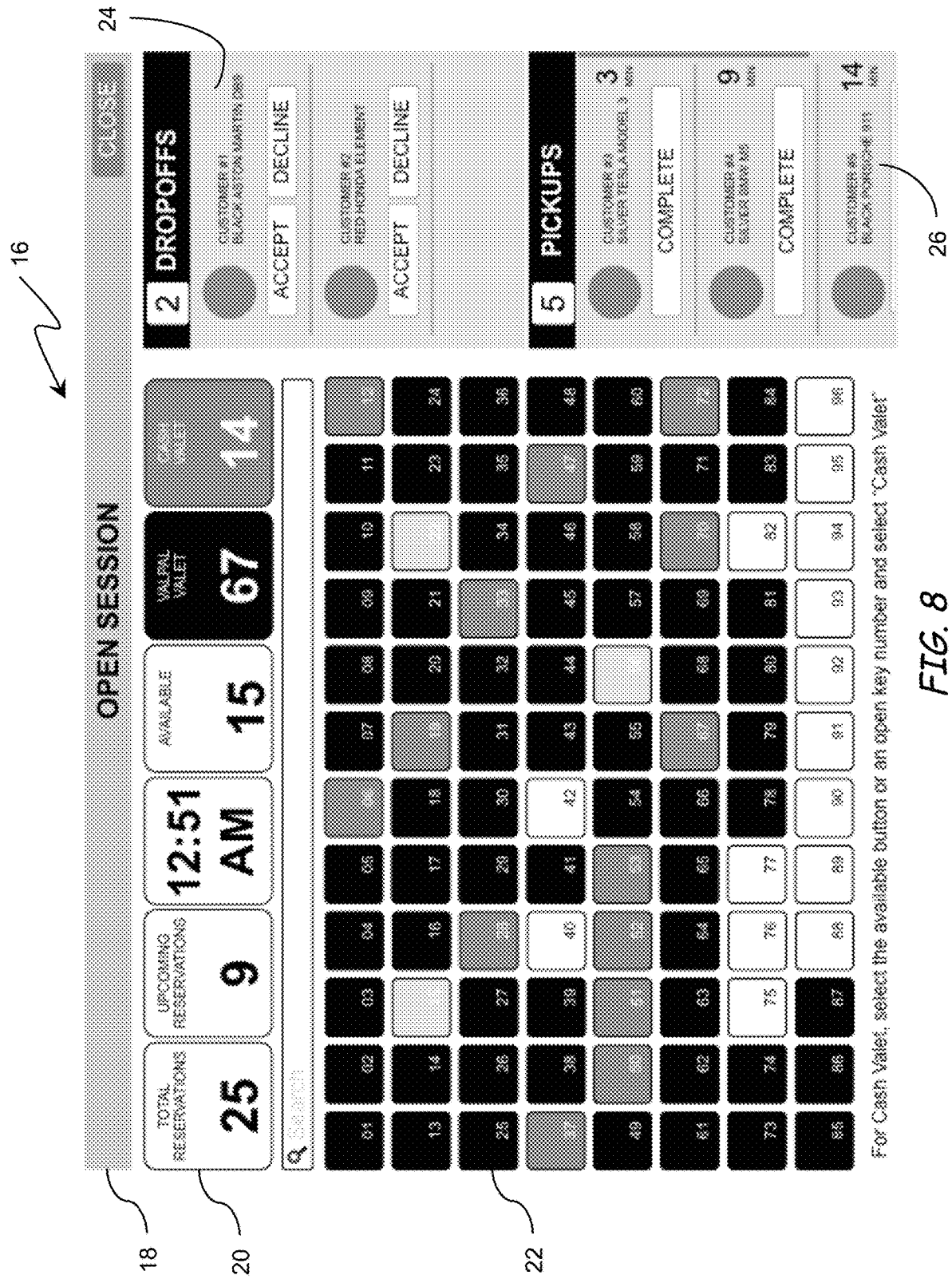
FIG. 8 is a first screen shot of a first user interface computer screen for the computer-based valet park system according an embodiment of the present invention.

When the individual is ready to leave the establishment or retrieve their vehicle for any other reason, the individual may make a request to retrieve the vehicle at step 480 to server 12 through first computer 14 (see FIG. 6). Server 12 will place the retrieval request in the queue at step 490 and identify the spot the vehicle is parked in and alert the valet at step 500 that the vehicle is to be retrieved. Server 12 will also identify the number of pending retrieval requests for the particular establishment at step 510 and send an estimated retrieval time to the individual at step 520 through first computer 14.

Alternatively, the individual may specify a time to retrieve the vehicle to server 12 through first computer 14. Server 12 will place the retrieval request in the queue at step 490 and identify the spot the vehicle is parked in and alert the valet at step 500 that the vehicle is to be retrieved and server 12 will specify the time the individual has requested to retrieve the vehicle so that the vehicle will be waiting for the individual when the individual approaches the valet stand. Once the vehicle is collected by the individual from the valet at step 530, the request is complete and valet parking system 10 is ready for a new reservation request.

Valet parking system 10 will also offer the individual an opportunity to rate their recent valet service at the completion of the valet. This will provide valuable customer feedback to both the valet and establishment using the valet for valet parking services. This timely feedback can be used to reinforce the positive actions taken by the valet workers and to emphasize areas of improvement.

As stated above, the payment system will ensure payment for services offered under valet parking system 10 are accurately billed and collected. The payment system will ensure that payments under valet parking system 10 are made by a valid credit card, debit card or other financial institution account that is included with the user profile of the individual. The credit card or debit card information may be stored in the database at server 12. A preauthorized credit card or debit card stored in the database at server 12 may be verified during the reservation process at step 540 at FIG. 7. If the credit card or debit card is invalid an error will be display on first computer 14 at step 550 and the individual will be required to enter new credit card or debit card information at step 560. If the credit card or debit card is verified at step 540, the unique identification number is issued by server 12 at step 430 and is sent to the database at step 440 and to first computer 14 on a valet ID screen 670 depicted in FIG. 12H to inform the individual that their credit card or debit card information has been verified and their reservation has been accepted.

Figure 12J:
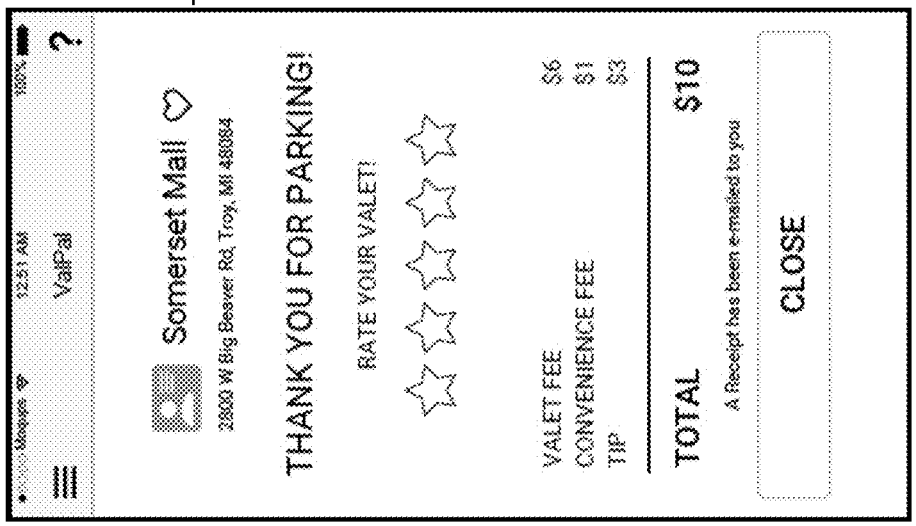
Figure 12I:
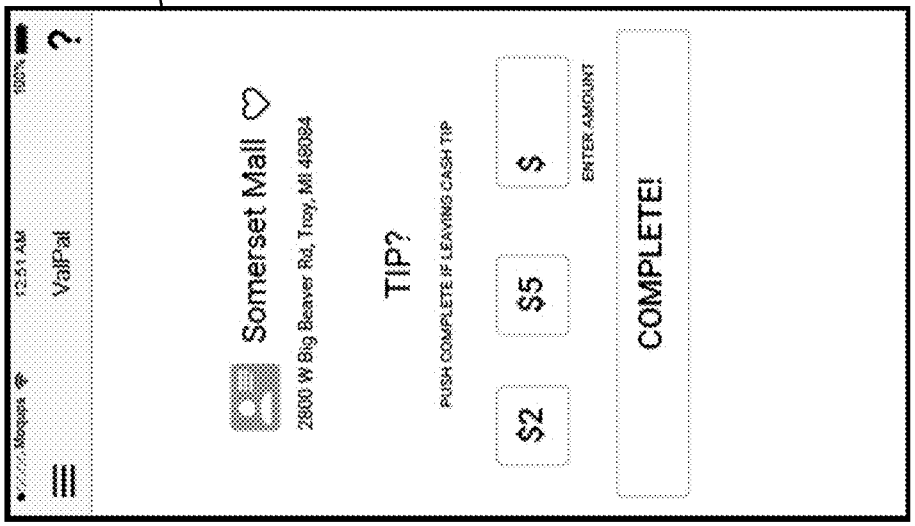

The payment system may offer an opportunity to the individual to tip the valet. The individual may choose to tip the valet to reflect the level of service the valet provided the individual in the handling and care of their vehicle during the valet service. Valet park system 10 provides the individual an opportunity to add a tip for the valet to their valet service bill to be paid by credit card. When a vehicle retrieve request is made by the individual at step 480 through first computer 14, a tip screen 680 illustrated in FIG. 12I, will invite the individual to leave a tip for the valet. The individual may decide at step 570 to leave a tip and specify the amount at step 580. Once specified, server 12 will charge the credit card the amount of the valet service and the tip amount specified by the individual and the individual will collect their vehicle and be on their way. The individual will be offered the thank you screen 690 illustrated in FIG. 12J to complete the transaction.

While a valid credit card may be stored in a user profile to make a valet reservation through system 10, an individual may choose to pay cash for the valet services they receive. The valet will have the ability to accept the cash from the individual and manually zero out the credit card balance through terminal 18 of second computer 16. Also, the individual may desire to pay for the valet service with the credit card but may decide to offer the valet cash as a tip in an amount relative to the level of service provided.

The payment system of valet parking system 10 will ensure that adding the payment information for an individual to their profile and storing that information on server 12 will provide for a seamless transaction process when the individual desires to utilize valet parking services 10. This will offer a number of advantages versus the traditional methods of payment. First, the individual no longer will need to carry cash to pay for valet parking services or any tips to the valet for proper care and timely retrieval of their vehicle. Valet parking system 10 will ensure that a proper method of payment is stored for convenience and ease of use by the individual. Second, the individual may have the ability to ensure that a valet parking spot can be reserved through the use of the stored payment method on server 12. The individual will not have to worry about the lack of parking spots in the valet lot if one can be reserved ahead of their arrival at the destination. Third, the individual will always have the option to pay for the valet services and/or tip the valet with cash if they so desire. Fourth, the valet parking company will also benefit from the convenience of paying by credit card and debit card. As mentioned above, valet parking spots may be reserved by the individual ahead of their arrival. This may enable the valet to plan the number of valet parking spots to be used at the establishment and perhaps, more importantly, how many valet workers will be needed at the establishment for a particular time period. Pre-payment of the reservation through valet parking system 10 will also help to ensure that the valet is paid for the reserved spot even if the individual fails to show up at the establishment to claim their reserved parking spot. The valet is able to obtain some recourse for holding a valet parking spot open if the individual fails to arrive. Fifth, valet parking system 10 may limit the number of opportunities that actual valet workers will encounter cash transactions thus ensuring more accurate accounting and possibly limiting lost or stolen funds. Sixth, the all credit card or debit card transactions will be seamless for both the individual driver and valet. The individual will transfer their car to the valet at the valet stand. The individual simply exits the vehicle upon arrival and the valet enters the vehicle to drive the vehicle to valet parking lot. There is no need for a paper ticket or to fill out the information on the ticket. There is no opportunity to lose the paper ticket. There is no exchange of funds. The individual may move quickly from their vehicle to the establishment and know that their vehicle may be retrieved for them at a moment's notice.

As depicted in FIGS. 8-11, terminal 18 of second computer 16 may be the central terminal screen used by the valet to coordinate vehicle reservation acceptance, parking locations and availability, vehicle drop-offs and vehicle pickups among other services. As mentioned above, terminal 18 of second computer communicates with server 12 to gain access to the database of information as well as any incoming reservation or retrieval information provided by the individual through first computer 14. Terminal 18 may include a parking status bar 20 that may indicate the number of total reservations, upcoming reservations, time, available parking spots those clients paying with credit card and those clients paying with cash.

Terminal 18 may also include a field of boxes 22 that correspond to the total number of parking spaces available to be used for parking. When in use, boxes 22 may be illuminated with different colors to indicate whether a particular spot is occupied, reserved or free. Boxes 22 may also flash to indicate that some action needs to be taken with regards to the particular parking spot. For example, a vehicle may be approaching and the individual driving may have reserved the particular spot or an individual may have sent a message to server 12 that they would like to retrieve their vehicle.

Figure 9:
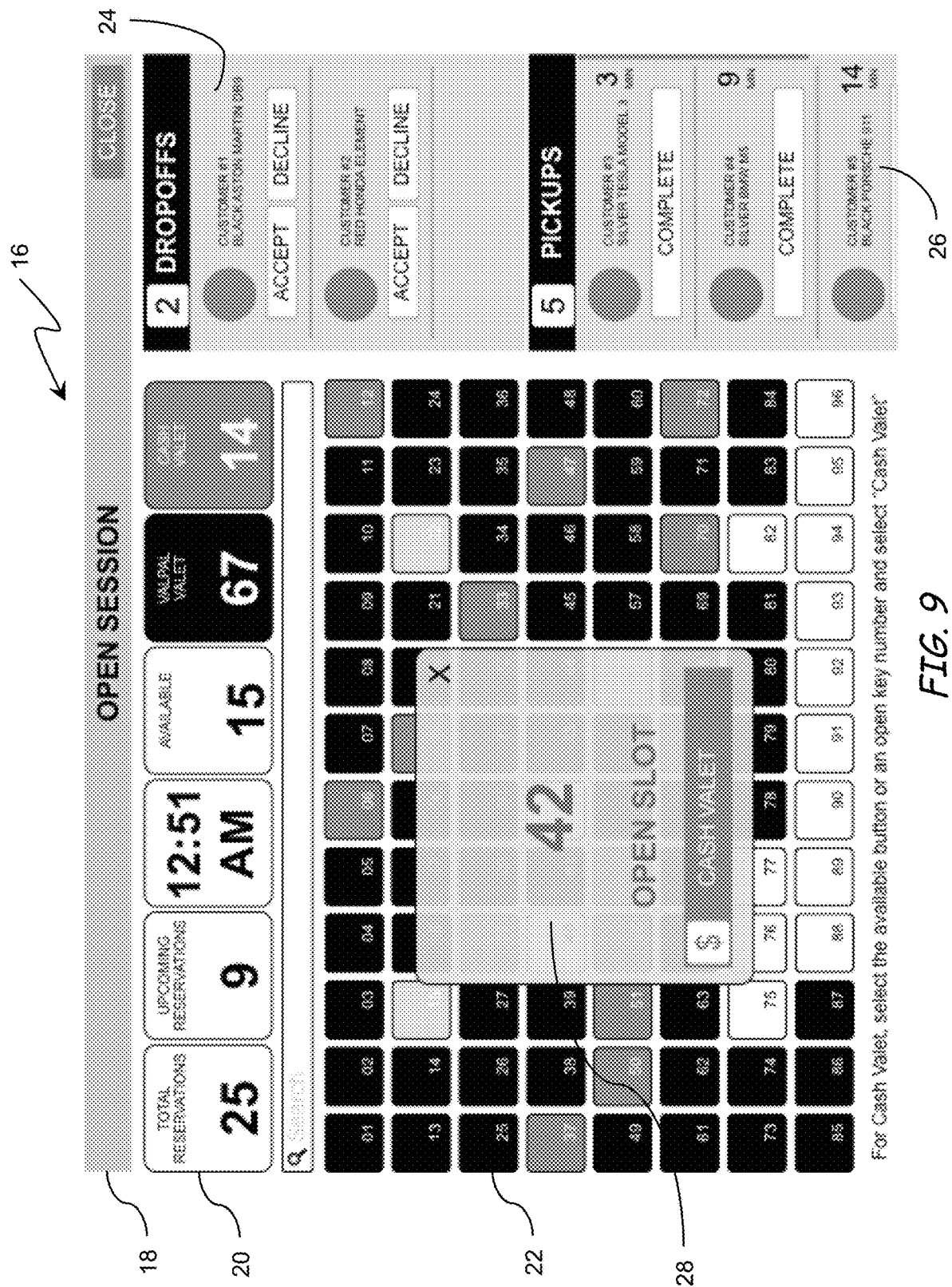
FIG. 9 is a second screen shot of the first user interface computer screen for the computer-based valet park system according an embodiment of the present invention.
Figure 10:
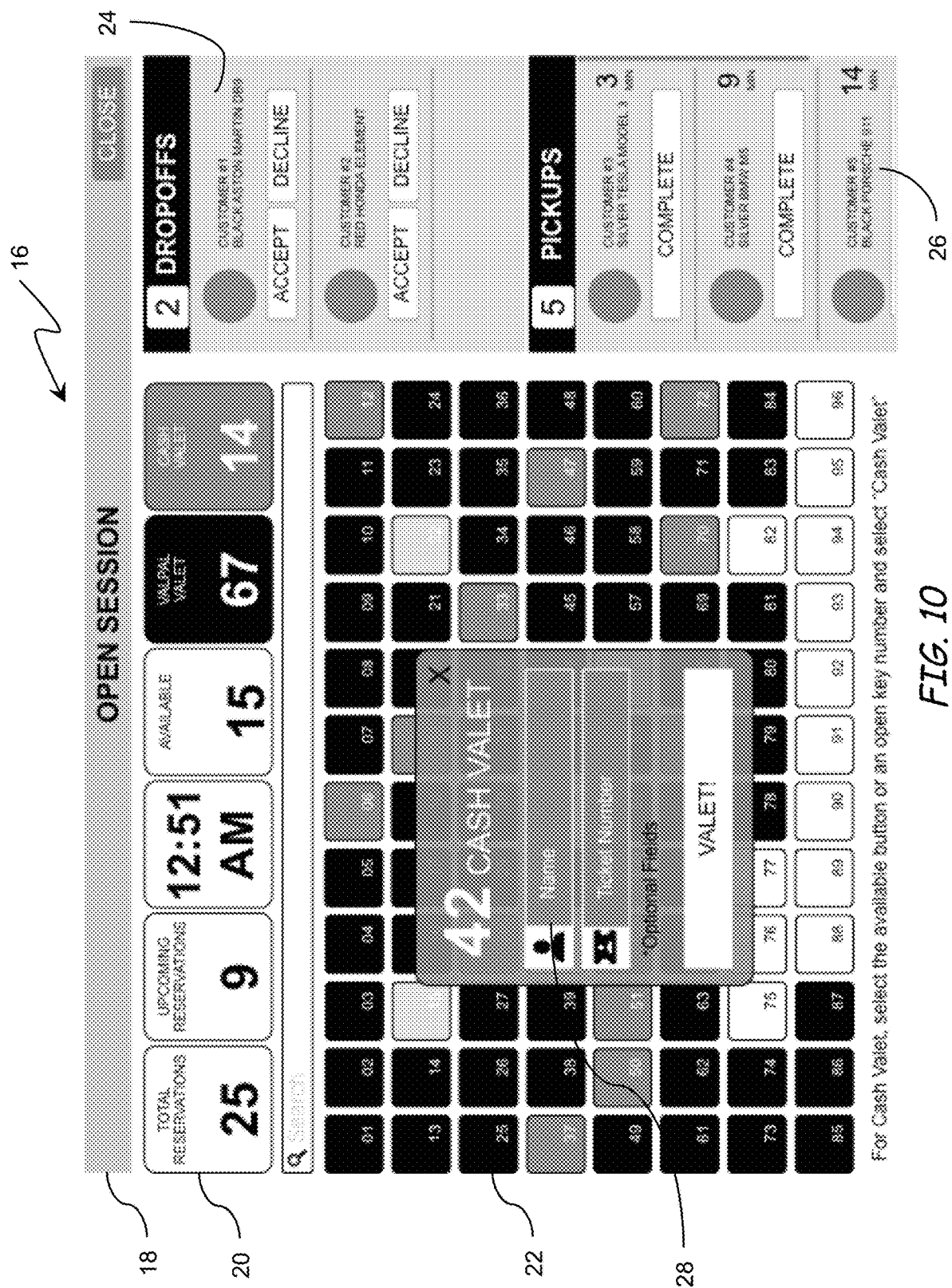
FIG. 10 is a third screen shot of the first user interface computer screen for the computer-based valet park system according an embodiment of the present invention.

Another area of terminal 18 may indicate the number of incoming vehicles to be parked in the drop-section 24 of the screen. The pick-up section 26 indicates which vehicles are in the queue to be retrieved. Pop-up screens 28, as shown in FIGS. 9-11, provide the terminal user an opportunity to indicate whether a vehicle has been accepted, picked-up or to enter any further information that may be relevant to operate valet parking system 10 efficiently.

In another embodiment of the present invention, the advent of autonomous vehicles may eliminate the need for a human valet altogether. Using valet parking system 10 described above, an individual can request to valet their vehicle at a particular establishment. Valet parking system 10 will identify the individual along with the make, model and license plate number of their registered vehicle in the manner described above. Upon arrival at the location, the individual may exit the vehicle and direct valet parking system 10 to interact with an on-board computer of the vehicle through first computer 14 such as a hand held smart phone. Parking system 10 will employ the autonomous driving and parking features of the vehicle to direct the vehicle to a parking location. Upon completion of business, the individual may alert valet parking system 10 that they are ready to leave the establishment and they require their vehicle. Valet parking system 10 will once again employ the autonomous and parking features of the vehicle to retrieve the vehicle and call the vehicle back to the valet stand. Once the vehicle has returned to the valet stand, the individual may enter the vehicle once again and drive off. Payment to the establishment for the use of the valet parking services may be completed as described above with a credit card or debit card linked to any computer device.

In yet another embodiment of the present invention, municipalities may employ the use of valet parking system 10 described above to park vehicles on city streets or city lots and ensure the collection of fees for the parking services. Valet parking system 10 may also make it easier for individuals and individuals to access particular establishments. Rather than having to park a distance away from an establishment such as a restaurant or business and having to walk that distance to the establishment, one may stop their vehicle directly in front of the establishment that are going to patronize and go directly from their vehicle into the establishment. This will ease the burden of inclement weather and improve safety and security of the individual or group that comes with a long walk from a parking lot to an establishment that may occur late at night or early morning.

As described above, the individual may request the valet parking services of the municipality through a computer such as the hand-held device. Upon arrival at their destination, the individual may exit the vehicle directly in front of or very near the establishment they wish to patronize. The municipalities valet parking system 10 will interact with the vehicle on-board computer and employ the autonomous driving and parking features of the vehicle to park the vehicle where there is adequate parking for the vehicle, perhaps on a city street or in a city designated parking lot or structure. Upon completion of business, the individual may alert the parking system that they are ready to leave the establishment and they require their vehicle. The parking system will once again employ the autonomous and parking features of the vehicle to retrieve the vehicle and call the vehicle back to the establishment. Once the vehicle has returned, the individual may enter the vehicle once again and drive off. Payment to the municipality for the use of the valet parking services may be completed as above with a credit card linked to any computer device. The municipalities may also realize revenue streams from the establishments themselves for the privilege and convenience of using the municipal parking system. Further, because all payments for parking would be linked electronically to a credit card, debit card or bank account, there would be no further need for parking enforcement. The municipality can continue to charge the credit card, debit card or bank account until the vehicle is retrieved.

The present invention has been particularly shown and described with reference to the foregoing embodiments, which are merely illustrative of the best modes presently known for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method within the scope of these claims and their equivalents be covered thereby. This description of the invention should be understood to include all novel and non-obvious combination of elements described herein, and claims may be presented in this or a later application to any novel non-obvious combination of these elements. Moreover, the foregoing embodiments are illustrative, and no single feature or element is essential to all possible combinations that may be claimed in this or a later application.

What is claimed is:

1. A computer-implemented parking system for managing a plurality of vehicle parking spaces disbursed over a plurality of physically separate parking locations, the system comprising:

at least one central server including one or more databases for storing information associated with a vehicle and user of the vehicle;

at least one first computer capable of communicating with said central server;

at least one second computer capable of communicating with said central server and said first computer;

a payment system that enables an electronic payment to be sent directly from said first computer to said central server;

a reservation system, said reservation system enabling a user to reserve one of the plurality of physically separate parking locations on said first computer and said reservation system enabling the user to reserve one of the plurality of physically separate parking locations at a pre-determined time on said first computer;

a vehicle retrieval system, said vehicle retrieval system estimating a vehicle retrieval time based upon a number of vehicles to be parked, a number of arrival requests and a number of retrieval requests, said vehicle retrieval system enabling the user to request the vehicle to be retrieved at a pre-determined time on said first computer and said vehicle retrieval system transmitting estimated vehicle retrieval time to said first computer and said second computer;

wherein said first computer retrieves user information and vehicle information from said central server and said first computer transmits the user information and vehicle information to said second computer to reserve at least one of said plurality of vehicle parking locations for the vehicle and said second computer alerts said parking system that the vehicle has arrived;

wherein said second computer communicates with said central server to send user information, vehicle information and vehicle location information to said central server; and wherein said first computer transmits user information, vehicle information and vehicle retrieval information from said central server to said second computer to retrieve the vehicle from the parking location.

2. The computer-implemented parking system as recited in claim 1, wherein said at least one central server communicates with at least one first computer and said at least one second computer over a plurality of computer networks.

3. The computer-implemented parking system as recited in claim 1, wherein said electronic payment is a credit card with information from the credit card stored on said at least one first computer.

4. The computer-implemented parking system as recited in claim 1, wherein said at least one first computer is a hand-held computer device.

5. The computer-implemented parking system as recited in claim 1, wherein said at least one second computer is a hand-held computer device.

6. The computer-implemented parking system as recited in claim 1, wherein said first computer transmits a location and an arrival time to said central server and said second computer.

7. The computer-implemented parking system as recited in claim 1, wherein said one or more databases of said at least one central server further includes information on the number of parking spots available at said plurality of physically separate parking locations and said central server will alert said first computer if there are zero parking spots available at any selected parking location.

8. The computer-implemented parking system as recited in claim 1, wherein said central server identifies a specific parking spot at one of said plurality of physically separate parking locations for the vehicle and sends information on the specific parking spot to said first computer and said second computer.

9. The computer-implemented parking system as recited in claim 1, wherein said central server alerts said second computer when a vehicle retrieval is initiated.

10. The computer-implemented parking system as recited in claim 1, wherein said central server provides a vehicle retrieval time to said first computer and said second computer based upon the number of vehicles in the queue to be parked and retrieved.

11. A method for the implementation of a valet parking system comprising the steps of:
providing a valet parking system that includes:
at least one central server including one or more databases for storing information associated with a vehicle and user of the vehicle;
at least one first computer capable of communicating with said central server;
at least one second computer capable of communicating with said central server and said first computer;
a payment system that enables an electronic payment to be sent directly from said first computer to said central server;
receiving a request by said central server from said first computer to reserve a parking location at a pre-determined time specified by the user;
sending user and vehicle information related to the parking location stored on said central server from said first computer to said second computer;
receiving a request by said central server from said first computer to retrieve a vehicle from the parking location at a pre-determined time specified by the user;
calculating a vehicle retrieval time for the vehicle based upon the number of vehicles waiting to be parked, the number of arrival requests and the number of retrieval requests;
providing the vehicle retrieval time from said central computer to said first computer and said second computer;
sending user and vehicle information related to the retrieval of the vehicle stored on said central server from said first computer to said second computer; and
sending electronic payment information from said first computer through said payment system to said central server.

12. The method for the implementation of a valet parking system as recited in claim 11 further comprising the step of receiving a parking location and arrival time by said central server from said first computer.

13. The method for the implementation of a valet parking system as recited in claim 11 further comprising the steps of:
identifying the number of parking spots available at a parking location on said central server; and
alerting said first computer if there are zero parking spots available at any selected parking location.

14. The method for the implementation of a valet parking system as recited in claim 11 further comprising the steps of:
identifying a specific parking spot by said central server at a parking location for the vehicle; and
sending information on the specific parking spot to said first computer and said second computer.

15. The computer-implemented parking system as recited in claim 1, wherein said second computer includes a central terminal screen, said central terminal screen including:
a parking status bar, said parking status bar indicating the total number of reservations and the time of future reservations from said reservation system, the total number of available parking locations, and the number of users paying by cash or electronic payment;
a plurality of first boxes, said plurality of first boxes corresponding to a plurality of parking locations;
a drop-section, said drop-section indicating an approaching vehicle to be parked;
a pick-up section, said pick-up section indicating when the vehicle is to be retrieved; and
a plurality of pop-up screens, said plurality of pop-up screens providing a terminal user an interface to enter any relevant information relating to the arrival, parking or retrieval of the vehicle.

* * * * *